United States Patent
Kurokawa et al.

(10) Patent No.: US 10,162,134 B2
(45) Date of Patent: Dec. 25, 2018

(54) TRANSMITTING OPTICAL MODULE IMPLEMENTING OPTICAL WAVEGUIDE DEVICE

(71) Applicant: Sumitomo Electric Industries, Ltd., Osaka-shi (JP)

(72) Inventors: Munetaka Kurokawa, Yokohama (JP); Shunsuke Sato, Yokohama (JP); Tomoya Saeki, Yokohama (JP); Yasushi Fujimura, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/965,466

(22) Filed: Dec. 10, 2015

(65) Prior Publication Data

US 2016/0170146 A1 Jun. 16, 2016

(30) Foreign Application Priority Data

Dec. 11, 2014 (JP) .................................. 2014-250601

(51) Int. Cl.
*G02B 6/42* (2006.01)

(52) U.S. Cl.
CPC ........... *G02B 6/4206* (2013.01); *G02B 6/425* (2013.01); *G02B 6/4224* (2013.01); *G02B 6/4244* (2013.01); *G02B 6/4257* (2013.01)

(58) Field of Classification Search
CPC ...... G02B 6/2938; G02B 6/32; G02B 6/4206; G02B 6/4224; G02B 6/4227; G02B 6/4257; G02B 6/43; G02B 6/4244; G02B 6/425

See application file for complete search history.

(56) References Cited

U.S. PATENT DOCUMENTS

| 4,405,236 A | * | 9/1983 | Mitsuhashi | G01C 19/66 356/459 |
| 4,958,896 A | * | 9/1990 | Brinkmeyer | G01M 11/3172 359/285 |
| 5,313,543 A | * | 5/1994 | Matsuda | G02F 1/377 359/328 |
| 5,414,787 A | * | 5/1995 | Kurata | G02B 6/30 385/88 |

(Continued)

FOREIGN PATENT DOCUMENTS

JP 2000-249876 A 9/2000

OTHER PUBLICATIONS

Park et al., "Micromachined lens microstages for two-dimensional forward optical scanning," Opt. Express 18, 16133-16138 (2010).*

(Continued)

*Primary Examiner* — Peter Radkowski
(74) *Attorney, Agent, or Firm* — Venable LLP; Michael A. Sartori; Laura G. Remus

(57) ABSTRACT

A transmitting optical module that includes multi-laser diode (LDs) and a planar lightwave circuit (PLC) to multiplex optical beams each output from the optical sources is disclosed. The PLC is mounted on a carrier through a WG carrier in upside down arrangement. The LDs are also mounted on the carrier through an LD carrier. The LDs and the PLC are optical coupled with two lenses each having respective optical axes offset from the other such that the optical coupling of the optical beam inputting the PLC becomes a maximum.

6 Claims, 9 Drawing Sheets

(56) References Cited

U.S. PATENT DOCUMENTS

| | | | |
|---|---|---|---|
| 5,457,149 A * | 10/1995 | Hall | C09J 181/06 257/E21.505 |
| 5,681,757 A * | 10/1997 | Hayes | H01L 21/563 156/295 |
| 5,714,252 A * | 2/1998 | Hogerton | H01L 23/145 174/255 |
| 5,832,153 A | 11/1998 | Duck | |
| 5,854,867 A * | 12/1998 | Lee | G02B 6/4214 385/49 |
| 5,907,646 A * | 5/1999 | Kitamura | G02B 6/4232 385/131 |
| 5,909,524 A * | 6/1999 | Tabuchi | G02B 6/423 385/14 |
| 6,316,281 B1 * | 11/2001 | Lee | G02B 6/136 385/14 |
| 6,437,654 B2 * | 8/2002 | Maruhashi | H01P 1/387 333/1.1 |
| 6,839,497 B2 * | 1/2005 | Park | G02B 6/12004 385/129 |
| 6,886,996 B2 * | 5/2005 | Shimada | G02B 6/12002 385/147 |
| 6,904,220 B2 * | 6/2005 | Shimada | G02B 6/12002 385/130 |
| 6,987,913 B2 * | 1/2006 | Blauvelt | G02B 6/12002 385/28 |
| 7,043,101 B1 * | 5/2006 | Huang | G02B 6/2746 359/484.02 |
| 7,050,681 B2 * | 5/2006 | Blauvelt | G02B 6/12002 385/28 |
| 7,095,928 B2 * | 8/2006 | Blauvelt | G02B 6/12004 385/49 |
| 7,097,366 B2 * | 8/2006 | Aoki | G02B 6/30 385/53 |
| 7,158,702 B2 * | 1/2007 | Blauvelt | G02B 6/12002 385/28 |
| 7,164,825 B2 * | 1/2007 | Blauvelt | G02B 6/12002 385/28 |
| 7,180,640 B2 * | 2/2007 | Maltseff | G02B 26/10 250/208.1 |
| 7,379,638 B2 * | 5/2008 | Blauvelt | G02B 6/12002 385/14 |
| 7,415,184 B2 * | 8/2008 | Ghiron | G02B 6/4231 385/129 |
| 7,421,160 B1 * | 9/2008 | Budd | G02B 6/30 385/129 |
| 7,424,188 B2 * | 9/2008 | Aoki | G02B 6/12002 385/40 |
| 7,565,044 B2 * | 7/2009 | Akahoshi | G02B 6/4226 385/129 |
| 7,577,327 B2 * | 8/2009 | Blauvelt | G02B 6/12002 385/129 |
| 7,663,210 B2 * | 2/2010 | Karkkainen | G02B 6/423 257/226 |
| 7,783,146 B2 * | 8/2010 | Blauvelt | G02B 6/12002 385/30 |
| 7,807,010 B2 * | 10/2010 | Pitault | H01L 23/544 156/285 |
| 7,853,103 B2 * | 12/2010 | Blauvelt | G02B 6/12002 349/187 |
| 7,885,499 B2 * | 2/2011 | Blauvelt | G02B 6/12002 385/30 |
| 7,916,984 B2 * | 3/2011 | Kim | G02B 6/43 385/129 |
| 8,625,989 B2 * | 1/2014 | Du | G02B 6/4215 398/43 |
| 8,831,049 B2 * | 9/2014 | Feng | H01S 5/141 372/20 |
| 8,964,805 B2 * | 2/2015 | Shen | G02B 6/12019 372/36 |
| 2001/0048705 A1 * | 12/2001 | Kitaoka | G02B 6/12004 372/50.11 |
| 2002/0110328 A1 * | 8/2002 | Bischel | G02B 6/4201 385/49 |
| 2003/0081902 A1 * | 5/2003 | Blauvelt | G02B 6/12002 385/50 |
| 2003/0108353 A1 * | 6/2003 | Nasu | H01S 5/02248 398/91 |
| 2003/0235371 A1 * | 12/2003 | Shimada | G02B 6/12002 385/50 |
| 2004/0028312 A1 * | 2/2004 | Park | G02B 6/12004 385/14 |
| 2004/0057085 A1 * | 3/2004 | Maltseff | G02B 26/10 358/474 |
| 2004/0057653 A1 * | 3/2004 | Fukuda | G02B 6/124 385/14 |
| 2004/0105161 A1 * | 6/2004 | Tatum | G02B 27/145 359/634 |
| 2004/0121520 A1 * | 6/2004 | Karkkainen | G02B 6/423 438/107 |
| 2004/0218849 A1 * | 11/2004 | Blauvelt | G02B 6/12004 385/14 |
| 2004/0234205 A1 * | 11/2004 | Shimada | G02B 6/12002 385/50 |
| 2005/0069274 A1 * | 3/2005 | Aoki | G02B 6/30 385/129 |
| 2005/0213889 A1 * | 9/2005 | Blauvelt | G02B 6/12002 385/50 |
| 2006/0120669 A1 * | 6/2006 | Blauvelt | G02B 6/12002 385/50 |
| 2006/0127011 A1 * | 6/2006 | Blauvelt | G02B 6/12002 385/50 |
| 2007/0110369 A1 * | 5/2007 | Blauvelt | G02B 6/12002 385/50 |
| 2007/0207670 A1 * | 9/2007 | Stewart | G02B 6/4246 439/607.01 |
| 2007/0211989 A1 * | 9/2007 | Blauvelt | G02B 6/12002 385/28 |
| 2007/0223552 A1 * | 9/2007 | Muendel | G02B 6/12004 372/50.12 |
| 2007/0274630 A1 * | 11/2007 | Ghiron | G02B 6/4231 385/33 |
| 2008/0080864 A1 * | 4/2008 | Bai | G02B 6/12019 398/79 |
| 2008/0199129 A1 * | 8/2008 | Akahoshi | G02B 6/4226 385/16 |
| 2008/0226222 A1 * | 9/2008 | Kim | G02B 6/423 385/14 |
| 2008/0226224 A1 * | 9/2008 | Blauvelt | G02B 6/12002 385/14 |
| 2008/0240654 A1 * | 10/2008 | Pearson | G02B 5/1861 385/37 |
| 2008/0285920 A1 * | 11/2008 | Budd | G02B 6/30 385/50 |
| 2009/0059344 A1 * | 3/2009 | Marxer | G02B 26/0841 359/290 |
| 2009/0321013 A1 * | 12/2009 | Pitault | H01L 23/544 156/305 |
| 2010/0008622 A1 * | 1/2010 | Watanabe | G02B 6/12004 385/14 |
| 2010/0024192 A1 * | 2/2010 | Blauvelt | G02B 6/12002 29/428 |
| 2010/0232462 A1 * | 9/2010 | Shen | G02B 6/12019 372/36 |
| 2010/0314027 A1 * | 12/2010 | Blauvelt | G02B 6/12002 156/91 |
| 2012/0189306 A1 * | 7/2012 | Du | G02B 6/4215 398/65 |
| 2012/0189314 A1 * | 7/2012 | Xu | H04B 10/506 398/135 |
| 2014/0079082 A1 * | 3/2014 | Feng | H01S 5/101 372/20 |

(56) References Cited

U.S. PATENT DOCUMENTS

2014/0126909 A1\* 5/2014 Song .................. H04J 14/06
　　　　　　　　　　　　　　　　　　　　398/65

OTHER PUBLICATIONS

Pezeshki, "High Performance MEMS-Based Micro-optic Assembly for Multi-lane Transceivers," ECOC 2013, Sep. 24 Programme, Tu.3.B.1.pdf.

\* cited by examiner

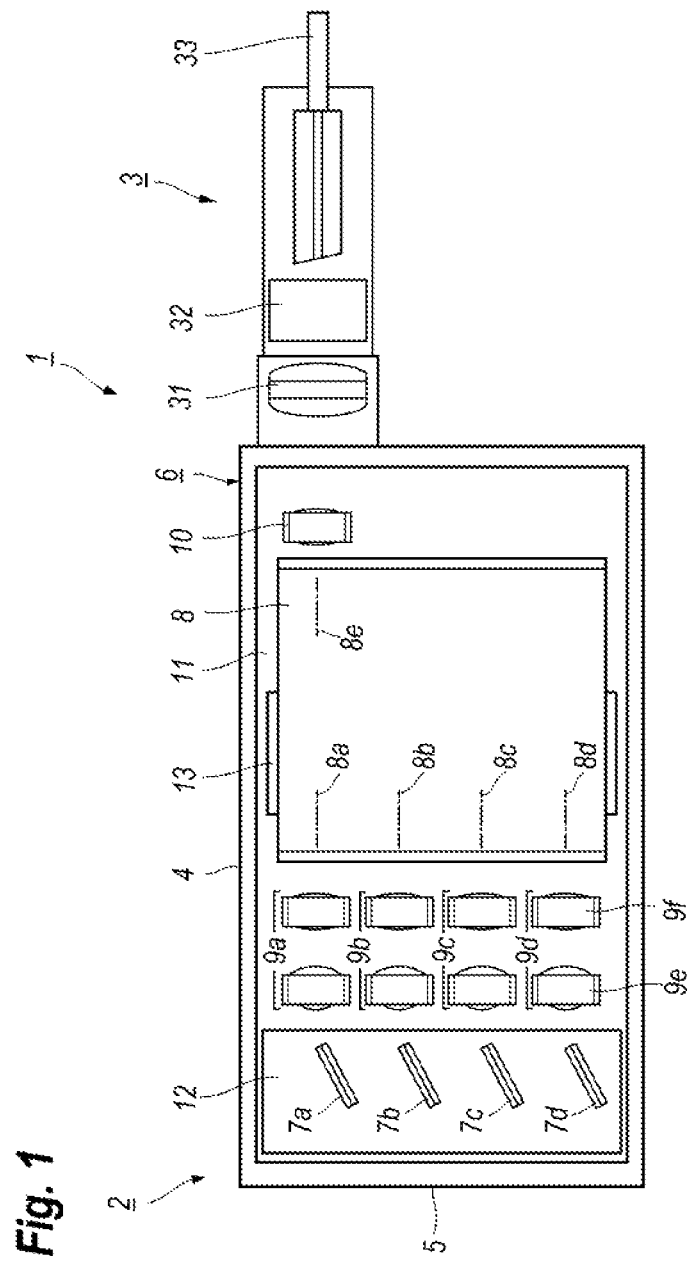

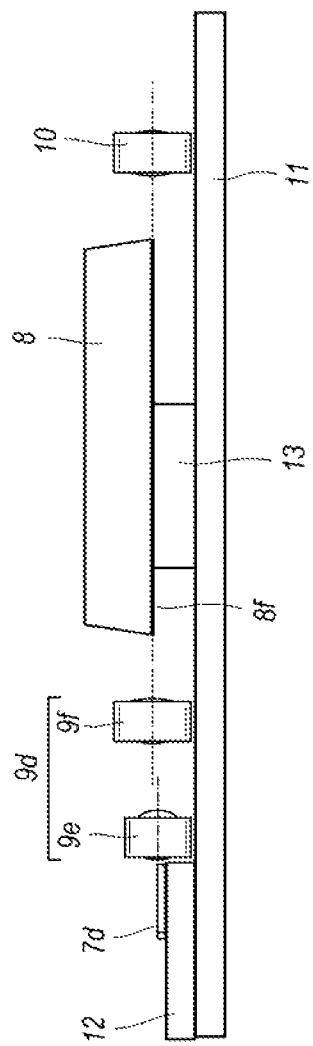

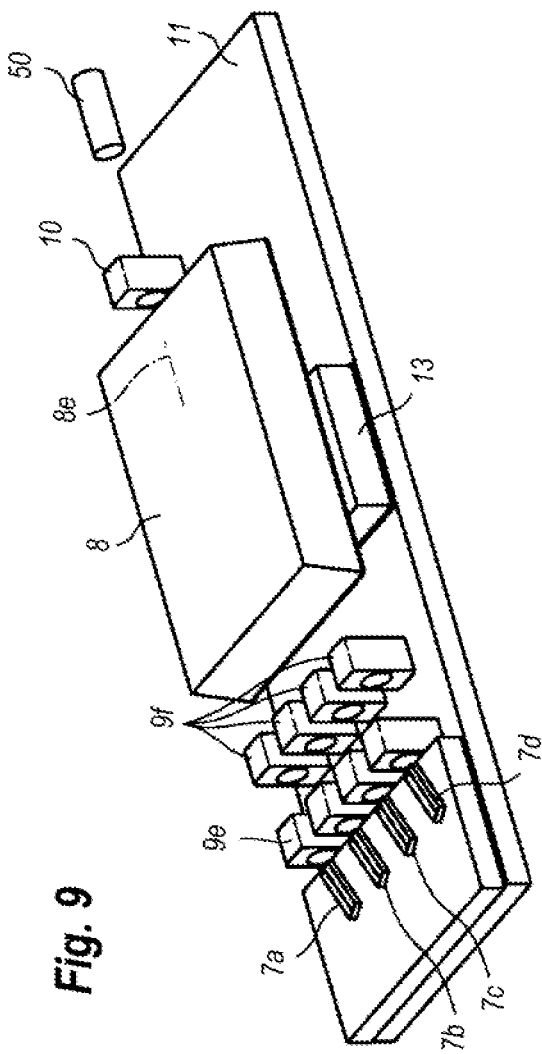

TRANSMITTING OPTICAL MODULE IMPLEMENTING OPTICAL WAVEGUIDE DEVICE

BACKGROUND OF THE INVENTION

1. Field of the Invention

The present application relates to a transmitting optical module, in particular, a transmitting optical module implementing with a planar light wave circuit (PLC) for multiplexing optical signals.

2. Background Arts

Recently, transmit ing optical modules are requested to be operable in high frequencies exceeding 40 Gbps, or sometimes reaching 100 Gbps, to enhance the communication capacity in an optical communication system. In such a high speed transmission, an optical signal that multiplexes a plurality of sub-signals each having wavelengths different from each other that is, the wavelength division multiplexing (WDM), becomes popular.

One example of a transmitting optical module applicable to such a WDM system has been disclosed in the U.S. Pat. No. 8,625,989, in which a transmitting optical module installs four semiconductor laser diodes (LDs) and multiplexes optical signals output from respective LDs. The transmitter optical module disclosed therein multiplexes the optical signals by a plurality of lenses, mirrors, wavelength selective filters (WSFs), and a polarization beam combiner (PBC). On the other hand, another transmitting optical module that multiplexes a plurality of optical signals by a planar lightwave circuit (PLC) including optical waveguides has been also known in the field.

SUMMARY OF THE INVENTION

An aspect of present application relates to an optical module that comprises a laser diode (LD), a waveguide device, and a carrier. The LD outputs an optical beam. The waveguide device includes an optical waveguide in a primary surface thereof. The optical waveguide optically couples with the LD. The carrier mounts the waveguide device as interposing a waveguide (WG) carrier, and the LD as interposing the LD carrier. A feature of the optical module of the present application is that the waveguide device is mounted on the WG carrier as a primary surface thereof providing the optical waveguide faces and in contact top the WG carrier.

Another aspect of the present application relates to a method to assemble an optical module that comprises a semiconductor laser diode (LD), a waveguide device, a lens system, and a carrier. The LD operates as an optical source. The waveguide device includes an optical waveguide optically coupled with the LD. The lens system couples the LD with the waveguide device and includes a first lens and a second lens. The carrier mounts, LD, the waveguide device as interposing a waveguide (WG) carrier having a mark, and the lens system. The method comprising steps of: (a) mounting the waveguide device on the WG carrier as aligning the optical waveguide of the waveguide device with the mark of the WG carrier; and (b) mounting the WG carrier on the carrier as aligning outer shape of the WG carrier with a mark provided on the carrier.

BRIEF DESCRIPTION OF THE DRAWINGS

The foregoing and other purposes, aspects and advantages will be better understood from the following detailed description of a preferred embodiment of the invention with reference to the drawings, in which:

FIG. 1 schematically illustrates a plan view of a transmitting optical module according to an embodiment of the present application;

FIG. 2 is a side view of a primary portion of the transmitting optical module shown in FIG. 1;

FIG. 3B shows a process to mount the intermediate assembly on the carrier;

FIG. 9 shows a process, subsequent to the process shown in FIG. 8, to align rest of the second lenses with the waveguide device.

DESCRIPTION OF EMBODIMENTS

Figure 3A:
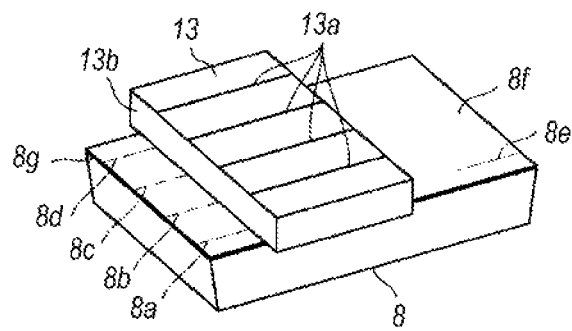
FIG. 3A is a perceptive view of an intermediate assembly that includes a waveguide device mounted on a WG carrier.

Next, some embodiments according to the present invention will be described as referring to accompanying drawings. In the description of the drawings, numerals or symbols same with or similar to each other will refer to elements same with or similar to each other without duplicated explanations.

FIG. 1 is a schematically illustrated plan view of a transmitting optical module according to an embodiment of the present application. The optical transmitter module 1 provides a body portion 2 and a coupling portion. The body portion 2 includes a housing 6 comprised of a box 4 and a lid air-tightly sealing the box 4. The coupling portion 3 is attached to one side of the box 4.

The box 4 installs a plurality of optical sources, 7a to 7d, namely, four (4) optical sources in the present embodiment. The box 4, in addition to the optical sources, 7a to 7d, installs some optical components including a waveguide device 8, input lens systems, 9a to 9d, and an output lens 10.

The optical sources, 7a to 7d, which are disposed in side by side with respect to the coupling portion 3, may be laser diodes (LDs) each emitting optical signals with wavelengths of, for instance, 1295.5, 1300.05, 1304.58, and 1309.14 nm, respectively. The input lens systems, 9a to 9d, each include a first lens 9e disposed closer to the respective LDs, 7a to 7d, and a second lens 9f disposed closer to the waveguide device 8.

The waveguide device 8, which may include a planar lightwave circuit (PLC) type of an arrayed waveguide grating (AWG), may multiplex the optical beams output from the LDs, 7a to 7d, and output a wavelength multiplexed beam. The waveguide device 8 provides input waveguides, 8a to 8d, whose ends face the respective input lens systems, 9a to 9d, and an output waveguide 8e whose end faces the output lens 10 and the coupling portion 3.

The output lens 10, which optically couples with the output waveguide 8e of the waveguide device 8, may collimate the wavelength multiplexed beam output from the output waveguide 8e of the waveguide device 8. The wavelength multiplexed beam is generally a dispersive beam because of a restricted source area of the output waveguide 8e.

The transmitter optical module 1 thus configured (1) couples the optical beams each output from the respective LDs, 7a to 7d, to the input waveguides, 8a to 8d, of the waveguide device 8 by the lens systems, 9a to 9d; (2) generates the wavelength multiplexed beam that multiplexes the optical signals by the waveguide device 8 from the output waveguide 8e; (3) outputs the wavelength multiplexed beam after being collimated by the output lens 10 to the coupling portion 3 through the window provided in the side of the body portion 2; and (4) optically couples the wavelength multiplexed beam output from the body portion 2 with an optical fiber 31 by a lens 31 implemented within the coupling portion 3 through an optical isolator 32 also implemented within the coupling portion 3.

The transmitting optical module 1 of the embodiment further provides a carrier 11 on which the LDS, 7a to 7d, the waveguide device 8, and lenses, 8a to 8e, are mounted.

FIG. 2 is a side view of the inside of the body portion 2. The input lens system 9d and the output lens 10 are directly mounted on the carrier 11 by adhesive, generally, ultraviolet curable resin. Although not illustrated in FIG. 2, the other input lens systems, 9a to 9c, are also mounted on the carrier 11 with the adhesive. The LD 7d is mounted on the carrier 11 through an LD carrier 12 commonly provided for the other LDs, 7a to 7c. That is, the one LD carrier 12 commonly mounts the LDs, 7a to 7c, thereon. The LD carrier 12 may also mount circuits to drive the LDs, 7a to 7d.

The waveguide device 8 is mounted on the carrier 11 through a waveguide carrier (WG carrier) such that the primary surface 8f of the waveguide device 8 at which the input waveguides, 8a to 8d, and the output waveguide 8e are formed, faces and is in contact to the WG carrier 13. The WG carrier 13 may be made of aluminum nitride (AlN) inherently enabling accurate processing. In an alternative alumina ($Al_2O_3$) or metals may be used for the WG carrier 13. The waveguide device 8 is mounted on the WG carrier 13 as being aligned with the input waveguides, 8a to 8d, thereof with the WG carrier 13; and the WG carrier 13 is aligned in the outer shapes thereof with the carrier 11.

Accordingly, the transmitting optical module 1 of the present embodiment may reduce scattering in the optical coupling efficiency between the input waveguides, 8a to 8d, and the LDs, 7a to 7d, because the waveguide device 8 in the input waveguides, 8a to 8d, thereof is aligned with the WG carrier and the WG carrier is aligned with the carrier 11 such that the levels of the input waveguides, 8a to 8d, measured from the carrier 11 are substantially determined by the thickness of the WG carrier 13.

Figure 3B:
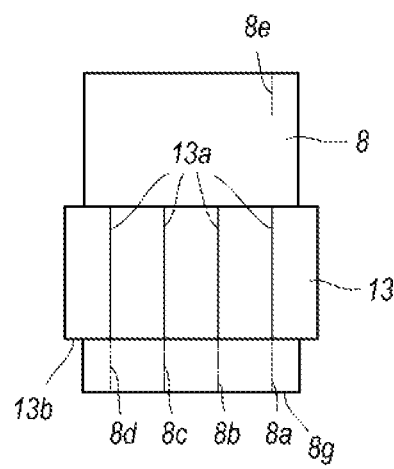
FIG. 3B is a bottom view of the intermediate assembly.
Figure 3C:
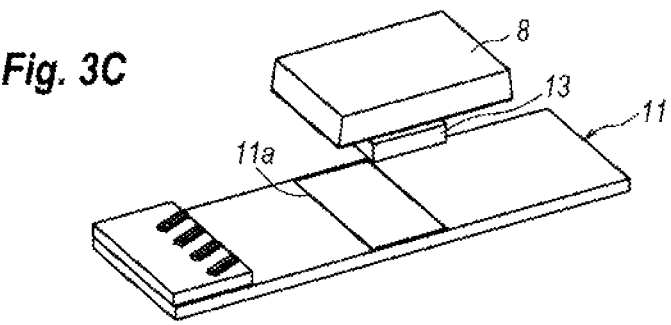

FIGS. 3A to 3C show processes to assemble the waveguide device 8 on the WG carrier 13, which forms an intermediate assembly; and to mount thus assembled intermediate assembly on the carrier 11. FIG. 3A is a perspective view of the intermediate assembly where the waveguide device 8 mounts the WG carrier 13 thereon. FIG. 3B is a plan view of the intermediate assembly, and FIG. 3C shows a process to mount the intermediate assembly on the carrier 11.

The WG carrier 13 provides marks 13a on a bottom surface thereof as shown in FIGS. 3A and 3B. The marks are served for aligning the WG carrier 13 with the input waveguides, 8a to 8d, of the waveguide device 8. The marks extend in parallel and have respective intervals equal to intervals of the input waveguides, 8a to 8d. Also, the carrier 11 provides another mark 11a that traces peripheries of the WG carrier 13.

The assembly of the waveguide device 8 on the carrier 11 through the WG carrier 13 is carried out as follows:

(1) Aligning the WG carrier 13 with the waveguide device 8. Specifically, the primary surface of the waveguide device 8, at which the input waveguides, 8a to 8d, and the output waveguide 8e are formed, against the WG carrier 13. Then, the front edge 13b of the WG carrier 13 is retreated from the front edge 8g of the waveguide device 8 as shown in FIG. 3B. Finally, the WG carrier 13 is aligned with the waveguide device 8 such that the marks 13a provided on the bottom surface of the WG carrier are aligned with the input waveguides, 8a to 8d, that is, the marks 13a are set on the positions extrapolated from the respective input waveguides, 8a to 8d.

(2) The WG carrier 13 is once detached from the waveguide device 8 as maintaining the relative angle against the waveguide device 8, that is, the WG carrier 13 is translated in parallel by a preset distance from the waveguide device 8 so as to be detached therefrom. Then, adhesive is applied on the primary surface of the waveguide device 8, and the WG carrier 13 is set on the adhesive by translating again in parallel by the preset distance. That is, the positional alignment between the WG carrier 13 and the waveguide device is recovered as putting the adhesive therebetween.

(3) The adhesive applied in the aforementioned process is cured. When the adhesive is ultraviolet curable resin, the irradiation of ultraviolet lays on the resign may cure the resin and the WG carrier 13 is fixed on the waveguide device 8, and the intermediate assembly of the WG carrier 13 and the waveguide device 8 may be obtained.

(4) The intermediate assembly is placed on the carrier 13 as aligning the outer peripheries of the WG carrier 13 with the mark 11a provided on the carrier 11, as shown in FIG. 3C. Although the front edge facing the LDs, 7a to 7d, and the rear edge thereof facing the output lens 10 are hidden under the waveguide device 8; sides connecting the front edge to the rear edge are recognizable because the sides protrude from the respective sides of the waveguide device 8, which means that a lateral width of the WG carrier 13 perpendicular to the input waveguides, 8a to 8d, is greater than a lateral width of the waveguide device 8 so that four corners of the WG carrier 13 are detectable. Thus, aligning the four corners of the WG carrier 13 with the respective corner of the mark provided on the carrier 13, the intermediate assembly may be aligned with the carrier 11.

(5) Detaching the intermediate assembly from the carrier 11 as maintaining the relative angle therebetween, an adhesive is applied on the carrier 11.

(6) Putting the intermediate assembly on thus applied adhesive and curing the adhesive, the intermediate assembly may be fixed in the preset position on the carrier 11.

The assembly of the waveguide device 8 on the carrier 11 through the WG carrier 13 thus described may not only align the input waveguides, 8a to 8d, with the respective LDs, 7a to 7d, but the optical axes of the input waveguides, 8a to 8d, may secure a preset level with respect to the top of the carrier 13 because the waveguide device 8 is put in upside down on the WG carrier 13.

Figure 4:
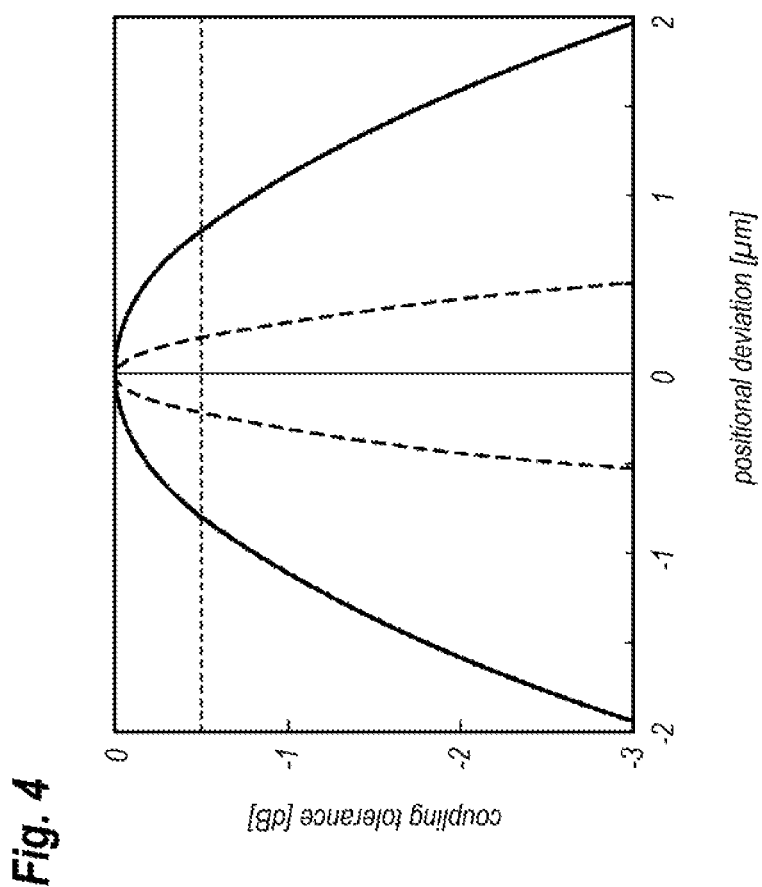
FIG. 4 shows coupling tolerances of the single lens system and the dual lens system.

FIG. 4 shows optical coupling tolerances between the LDs, 7a to 7d, and the input waveguides, 8a to 8d, as interposing the input lens systems, 9a to 9d, therebetween. The optical coupling tolerances are divided into two cases, that is, the input lens system includes only one lens (denoted as a broken line) and two lenses like the present embodiment (denoted as a solid line). The optical coupling tolerance is measured in the unit of dB from the position at which the maximum optical coupling is obtained. FIG. 4 assumes that the aperture of the LD is 0.5, while, that of the input waveguide is 0.2.

When the input lens system provides only one lens different from the present embodiment, the positional deviation of the lens, by which the optical coupling reduces to −0.5 dB from the maximum optical coupling, is allowed only by 0.22 µm. On the other hand, the input lens system comprising two lenses allows the positional deviation or the lenses, in particular, the second lens set apart from the LD, by 0.9 µm, namely about four times larger than the former deviation. Accordingly, the input lens systems, 9a to 9d, each comprising two lenses, 9e and 9f, may moderate the positional preciseness of the lenses.

Figure 5:
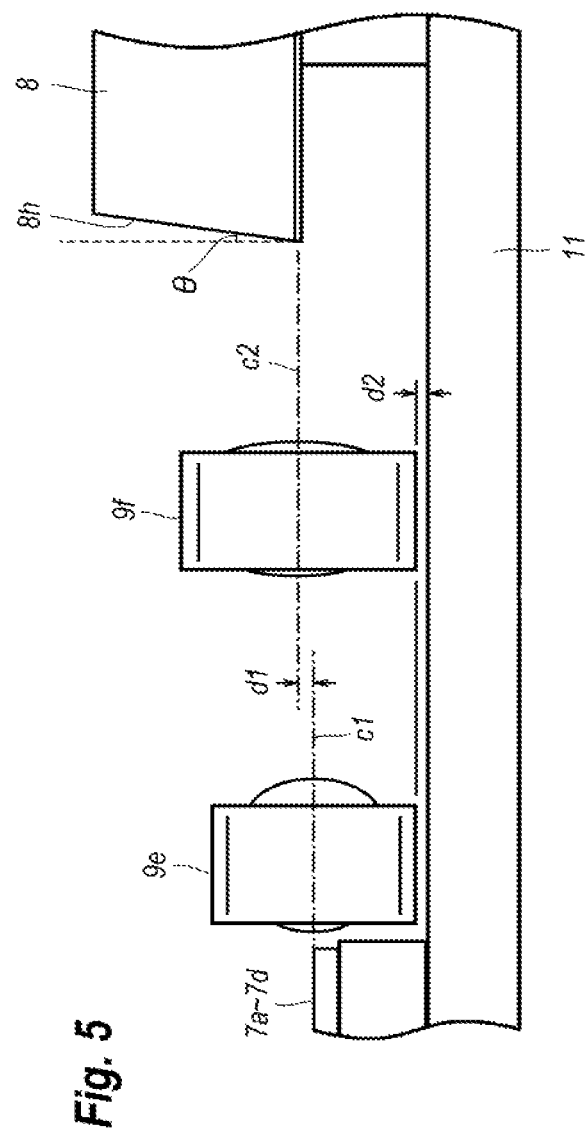
FIG. 5 shows an optical coupling mechanism between the LD and the waveguide device through the dual lens system.

FIG. 5 magnifies the optical coupling mechanism between the LDs, 7a to 7d, and the input waveguides, 8a to 8d, via the dual lens system, 9e and 9f. Referring to FIG. 5, the waveguide device 8 in the front side 8h thereof is inclined with respect to the optical axis of the LDs, 7a to 7d, or that of the input waveguides, 8a to 8, in order to prevent light reflected thereat from returning the LDs, 7a to 7d. Also, the optical axes c1 of the LDs, 7a to 7d, are aligned with the optical axes of the first lenses 9e disposed closed to the LDs, 7a to 76, while, the optical axes c2 of the second lenses 9f disposed apart from the LDs, 7a to 7d, or closer to the waveguide device 8, are aligned with the optical axes of the input waveguides, 8a to 8d. Furthermore, two optical axes, c1 and c2, are offset from each other with a gap d1 in order for the optical signals passing through the lens systems, 9a to 9d, to enter the input waveguides, 8a to 8d, with a preset angle.

That is, when the maximum optical coupling between the input waveguides, 8a to 8d, and the second lenses 9f is attained, wherein the input surface 8h of the waveguide device 8 is inclined by θ with respect to the surface perpendicular to the optical axis of the second lens 9f, two lenses, 9e and 9f, in respective optical axes are offset by an amount d1 according to an equation below.

$$d1 = (f/\alpha) \cdot \{\sqrt{(1+n \cdot \alpha)} - \sqrt{(1+\alpha/n)}\}, \text{ and}$$

$$\alpha = 1/(n \cdot \tan^2 \theta) - n,$$

where n and f are refractive index of the input waveguides, 8a to 8d, and a focal length of the second lens 9f in the side of the waveguide device 8, respectively.

The LD carrier 12 and the WG carrier 13 have respective thickness such that the optical axes of the LDs, 7a to 7d, are aligned with the optical axes of the first lenses 9e, and the optical axes of the input waveguides, 8a to 8d, are aligned with the optical axes of the second lenses 9f when the first lenses 9e and the second lenses 9f make a gap d2 common to each other against the top surface of the carrier 11. This arrangement will be described in detail below.

That is, the physical dimensions of the first lenses 9e and those of the second lenses 9f form the offset d1 between the optical axes thereof when the first and second lenses, 9e and 9f, are mounted on the carrier 11 with the common gap d2. This gap d2 corresponds to a thickness of an adhesive or resin to fix the lenses, 9e and 9f, to the carrier 11, That is, although the process to solidify or cure the adhesive or resin inevitably accompanies shrinks of the adhesive, which degrades the optical alignment of the lenses; the first and second lenses, 9e and 9f, of the present embodiment suffer the influence of the shrink by a degree same to each other. Accordingly, the optical coupling between the LDs, 7a to 7d, and the input waveguides, 8a to 8d, once aligned to each other may be maintained even after solidifying or curing the adhesive to fix the lenses, 9e and 9f.

Figure 6:
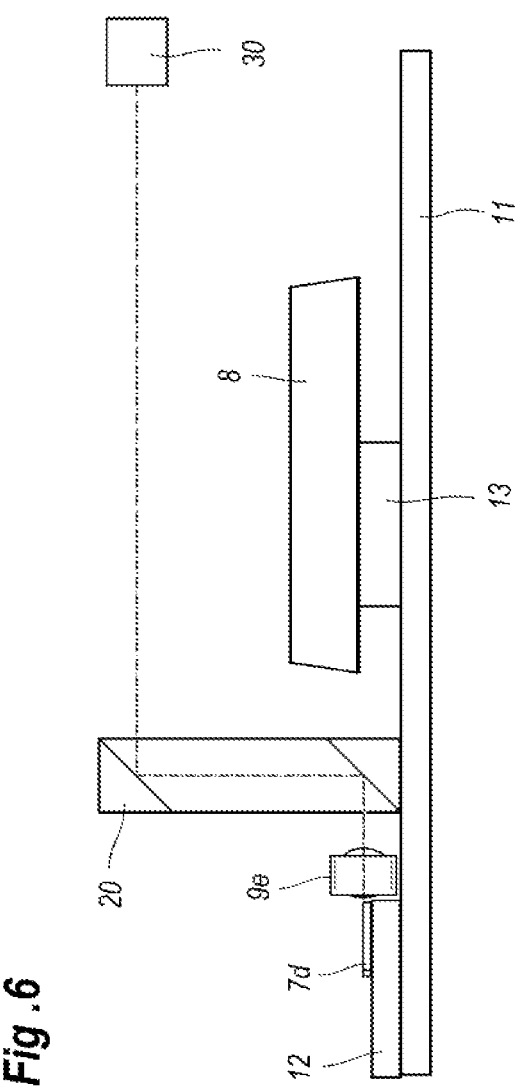
FIG. 6 shows a process to align the first lens on the carrier with the LD.

FIGS. 6 to 9 show processes to assemble the transmitting optical module 1 of the present embodiment. Referring to FIG. 6, the process first sets an alignment tool 20 between the first lens 9e and the waveguide device 8, where the waveguide device 8 is mounted on the carrier 11 through the WG carrier 13 by the alignment process described above in advance to assemble the lens systems, 9a to 9d. The alignment tool 20 may extract the optical beams each output from the LDs, 7a to 7d, outside of the housing 6. Monitoring the optical beams by a detector 30 positioned in a point far from the housing 6, for instance, one meter apart from the housing 6 in the present embodiment, the first lens 9e is optically aligned.

Applying an adhesive on the carrier 11 and practically activating the LD 7a, the first lens 9e is aligned such that the optical beam passing through the first lens 9e and detected through the alignment tool 20 and the detector 30 becomes a collimated beam. After positioning the first lens 9e, the adhesive is cured by irradiating with ultraviolet rays. The first lenses 9e in the other lens systems, 9b to 9d, are aligned by the process same with those described above. Ater all of the first lenses 9e are aligned, the adhesives are thermally solidified.

Figure 7:
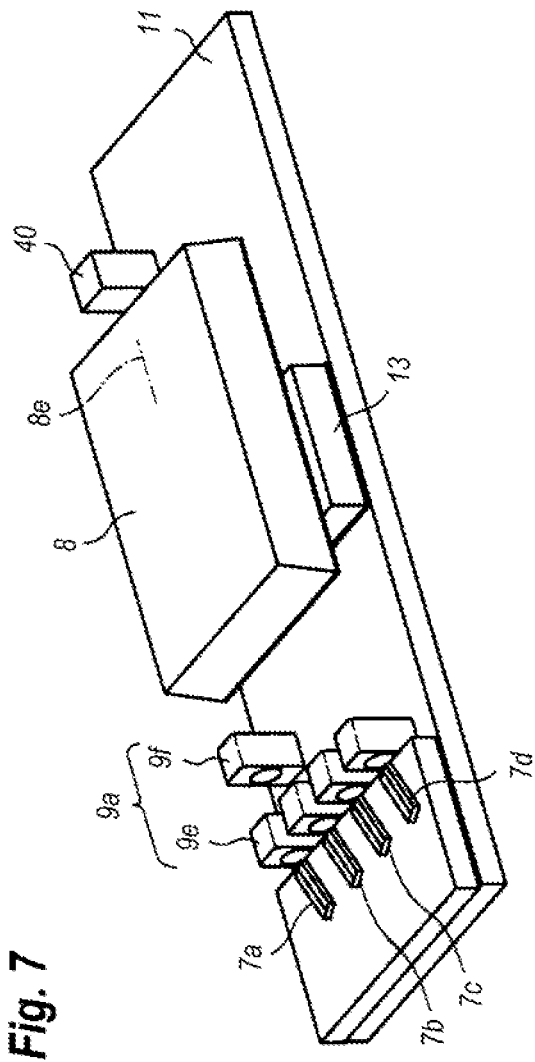
FIG. 7 shows a process, subsequent to the process shown in FIG. 6, to align the second lens with the first lens and the waveguide device.

The process then removes the alignment tool 20 from the carrier 11 and sets an optical sensor 40, such as a photodiode 40, in a position facing the output waveguide 8e of the waveguide device 8, as shown in FIG. 7. Applying another adhesive in a position on the carrier where the second lens 9f is to be mounted, the second lens 9f is aligned such that the optical output detected by the sensor 40 becomes a maximum. As described, when the optical coupling between the second lens 9f and the waveguide device 8, that is, when the optical power detected by the sensor 40 becomes a maximum, two lenses, 9e and 9f, in respective optical axes make the offset d1.

Figure 8:
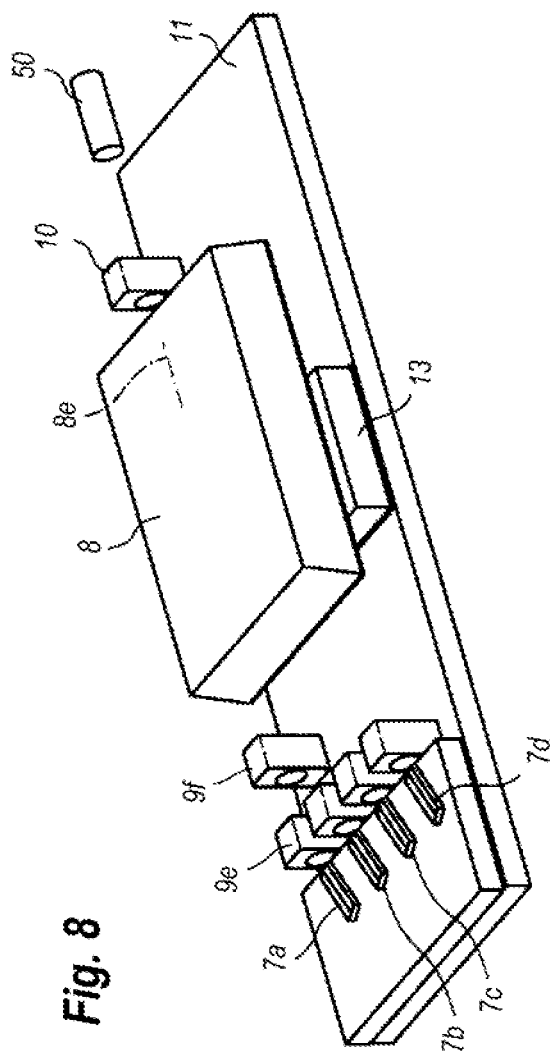
FIG. 8 shows a process, subsequent to the process shown in FIG. 7, to align the output lens with the waveguide device.

After one second lens 8f is thus aligned and fixed on the carrier 11, the process removes the optical sensor 40 and sets a dummy port 50 on the optical axis of the output waveguide 8e of the waveguide device 8 as shown in FIG. 8. The dummy port 50 emulates the coupling portion 3 of the transmitting optical module 1. That is, the dummy port 50 includes a concentrating lens and an external fiber. Activating the LD 7a practically, inputting the optical beam output from the LD 7a with the waveguide device 8, and outputting the optical beam from the output waveguides 8e, the output lens 10 is aligned with respect to the dummy port 50. The optical beam output from the output lens is converted into a collimated beam, and the concentrating lens in the dummy port concentrates this collimated beam on the external fiber. The output lens 10 is optically aligned such that the optical power detected through the external fiber becomes a maximum. After the alignment, the output lens 10 is permanently fixed on the carrier 10 by thermos-curing the adhesive.

Finally, as shown in FIG. 9, rest of second lenses 9f are aligned with respect to the external fiber in the dummy port 50 such that the optical power of the optical signal output from the respective LDs, 7b to 7d, processed in the waveguide device 8 and output therefrom, and optically coupled with the dummy port 50 becomes respective maxima. After the alignment, the second lenses 9e are fixed on the carrier 11 by thermos-curing the adhesive.

While particular embodiments of the present invention have been described herein for purposes of illustration, many modifications and changes will become apparent to those skilled in the art. For instance, the explanation concentrates on the marks 13a on the WG carrier having uniform intervals each aligned with the input waveguides, 8a to 8d, of the waveguide device 8. However, when the input waveguides, 8a to 8d, have variable intervals, the marks 13a may also have various intervals. Only the condition request to the marks 13a is that the marks are aligned with the input waveguides, 8a to 8d. Accordingly, the appended claims are intended to encompass all such modifications and changes as fall within the true spirit and scope of this invention.

What is claimed is:

1. An optical module, comprising:
a laser diode (LD) that outputs an optical beam;
a waveguide device including an optical waveguide in a primary surface thereof, the optical waveguide optically coupling with the LD, the waveguide device having a front edge facing the LD and a pair of sides each extending from the front edge along the optical waveguide, the sides determining a lateral width perpendicular to the optical waveguide of the waveguide device;
a waveguide (WG) carrier and an LD carrier, the WG carrier having a front edge facing the LD, a pair of sides extending from the front edge along the optical waveguide, a preset thickness, and corners, the sides of the WG carrier determining a lateral width of the WG carrier; and
a carrier that mounts the waveguide device through the WG carrier and the LD through the LD carrier, the carrier providing a mark aligned with the corners of the WG carrier,
wherein the waveguide device is mounted on the WG carrier where the primary surface thereof faces and is in contact with the WG carrier, and
wherein the front edge of the WG carrier is retreated from the front edge of the waveguide device, the lateral width of the WG carrier is greater than the lateral width of the waveguide device, the sides of the WG carrier extruding from the sides of the waveguide device and wherein the WG carrier has a mark in a bottom surface thereof that is opposite to a surface facing and in contact with the primary surface of the waveguide device, the mark in the WG carrier being aligned with the optical waveguide of the waveguide device.

2. The optical module of claim 1,
wherein the LD is optically coupled with the waveguide device through a first lens and a second lens mounted on the carrier, the first lens being disposed closer to the LD and the second lens being disposed closer to the waveguide device, and
wherein the first lens has an optical axis vertically offset from an optical axis of the second lens along a direction parallel to a normal of a surface of the carrier where the LD, the WG carrier, the LD carrier, the first lens and the second lens are mounted.

3. The optical module of claim 2,
wherein the waveguide device has an input surface inclined by an angle $\theta$ with respect to a plane perpendicular to the optical axis of the second lens, and
wherein the optical axis of the second lens forms an offset d1 against an optical axis of the first lens which is given by:

$$d1=(f/\alpha)\cdot\{\sqrt{(1+\alpha\cdot n)}-\sqrt{(1+\alpha/n)}\},$$

where $\alpha$ is given by:

$$\alpha=1/(n\cdot\tan^2\theta)-n,$$

where f and n are a focal length of the second lens in a side of the waveguide device and refractive index of the optical waveguide of the waveguide device, respectively.

4. The optical module of claim 3,
wherein the first lens makes a gap against the surface of the carrier equal to a gap between the second lens and the surface of the carrier.

5. The optical module of claim 3,
wherein the first lens is a collimating lens that collimates an optical beam output from the LD and the second lens is a concentrating lens that concentrates the collimated beam output from the first lens on the optical waveguide of the waveguide device.

6. The optical module of claim 1, wherein the WG carrier has a rectangular slab shape.

* * * * *